March 21, 1967 F. CREMER 3,309,732
APPARATUS FOR STRIPPING ARTICLES FROM FORMS
Filed Oct. 11, 1963 2 Sheets-Sheet 1
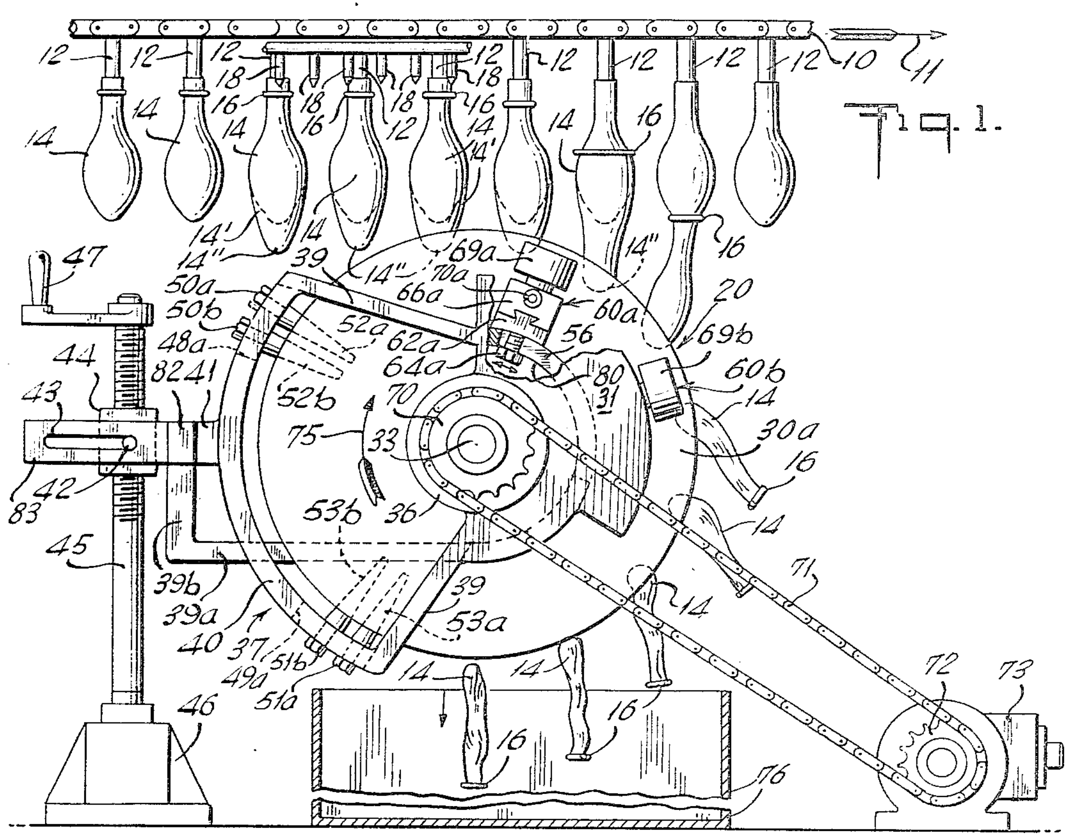
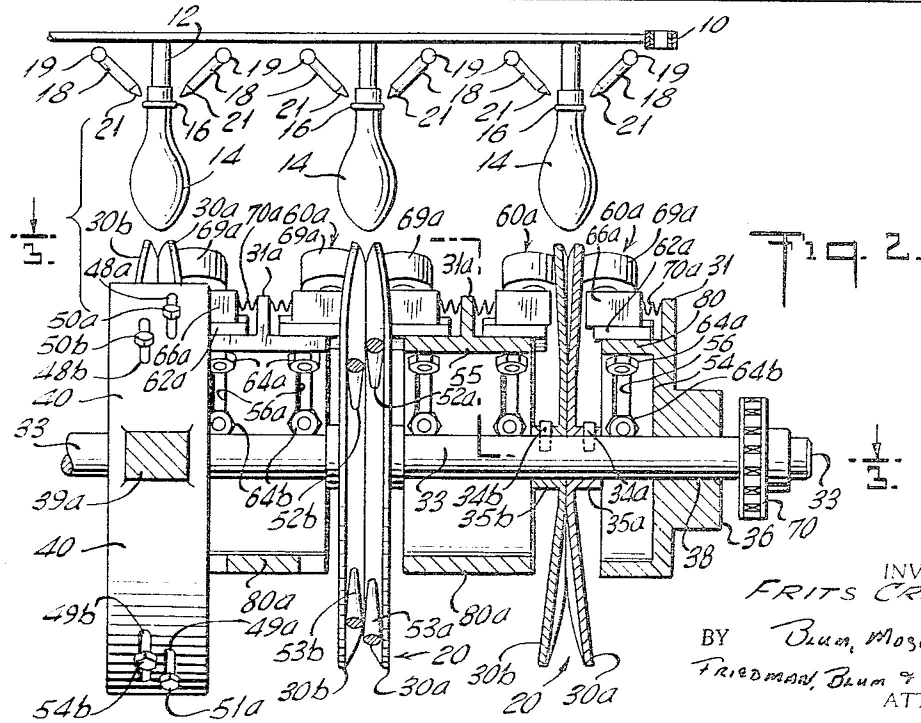
INVENTOR.
FRITS CREMER
BY Blum, Moscovitz, Friedman, Blum & Kaplan
ATTORNEYS APPARATUS FOR STRIPPING ARTICLES FROM FORMS
Filed Oct. 11, 1963 2 Sheets-Sheet 2
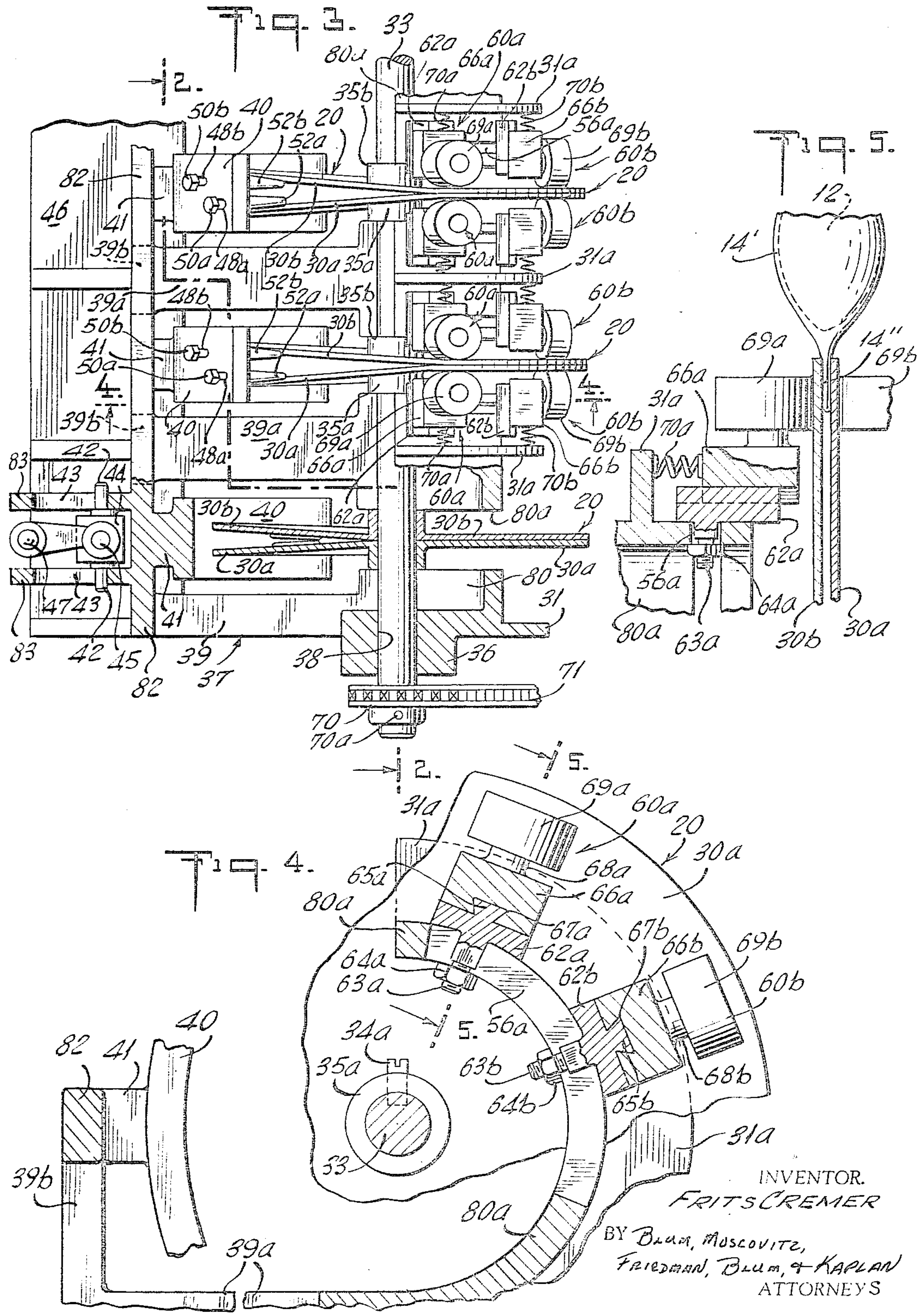

3,309,732
Patented Mar. 21, 1967

3,309,732

APPARATUS FOR STRIPPING ARTICLES FROM FORMS

Frits Cremer, New York, N.Y., assignor to Thomas M. Dodds, Inc., Garden City, N.Y., a corporation of New York Filed Oct. 11, 1963, Ser. No. 315,617
11 Claims. (Cl. 18—2)

This invention relates generally to improvements in the manufacture of articles of stretchable materials, and more particularly, to improvements in method and apparatus for automatically stripping or detaching elastic articles from their forms.

As is well known, articles of stretchable material, such as balloons, may comprise rubber or other elastomeric material. In the process of manufacturing articles of strretchable material, a form is used having a shape corresponding to the article to be formed and the rubber or other elastomeric material is deposited on to the form in a manner well known to those skilled in the art. A problem that presents itself arises with respect to automatic removal or stripping of the stretchable article from its respective form. The neck portion of the article is usually of reduced size compared to the main body portion of the article, and the neck portion at its opening is usually provided with a rim or bead portion, this construction requiring the portions of the reduced size to be stretched over the main body portion of the form for removal therefrom. This removal operation must be carefully performed to avoid damage to the articles and has proved to be a difficult one in the industry. In addition to manual removal of the article, other apparatus and techniques have been proposed, but improvement in the automatic mass stripping remain as a desideratum.

It is therefore the primary aim and object of the present invention to provide improved method and apparatus for automatically stripping or removing stretchable articles from their forms. The method and apparatus of the present invention has proved to be foolproof and practical for the low cost mass production of such articles, and overcomes the inherent deficiencies of the prior art proposals.

Pursuant to this object of the invention, the method and apparatus for removing articles from the forms are operative with a minimum of pressure on the articles to eliminate or minimize damage to the articles.

Another object of the present invention is to provide a device wherein the forms having the articles thereon need not necessarily be in exact alignment with the stripper mechanism.

The invention will be described specifically with hespect to balloons, but it will be obvious that the invention is not limited thereto and is applicable to other thin-walled rubber or elastomeric articles having various outer confiurations to form a toy device, or otherwise.

In accordance with the present invention, provision is made for the use of a pair of rotating resilient disks which are biased toward one another so their inner surfaces are in abutment. After the formation of the balloon pursuant to any of the well-known techniques, the balloon must be stripped from its form or mandrel and the present invention is directed to improved methods and apparatus for continuously stripping balloons from their forms at stripping stations albeit the forms are not in exact alignment with said disks. A preferred embodiment of the present invention includes a pair of resilient disks mounted to a shaft, with their inner surfaces abutting each other, and rotatable therewith. A plurality of depending forms containing balloons thereon are moved in a longitudinal path above the rotating disks by an endless conveyer. A pair of tapered rollers are radially disposed between the inner surfaces of the disks adjacent and before the uppermost point of said disks in the direction of rotation thereof, and operate to spread the disks apart in the proximity of the rollers so a balloon may be received in the crevice formed thereat. The balloon is inflated by a plurality of nozzles (atlhough a single one may also be used) which are disposed adjacent to the forms in proximity to the bead or rim of the balloon so that a blast or jet of air is operative to expand the balloon into engagement between the disks.

Further rotation of the disks away from the tapered rollers (with concomitant movement of the conveyor) allows the inner surfaces of the disks to move toward each other by action of their own resiliency, thereby clamping the balloon between these inner surfaces. Closing rollers, located adjacent and past the uppermost point of said disks (in the direction of rotation thereof), bias the disks toward each other thereby firmly gripping the lowermost portion of the balloon and stripping the balloon from the form with the relative action of the rotating disks and the longitudinally moving conveyer aiding each other. A further pair of closing rollers may be located after the uppermost point and before the lowermost point of the disks to aid in maintaining the balloons fixed between the disks during their rotation. A receiving container is placed below the lowermost point of the disks and a second pair of opening rollers extend radially between the disks adjacent to and past the lowermost point of the disks to spread the disks apart to release the stripped balloon and allow it to fall into the receiving container.

This air inflation of the balloons preliminary to the stripping thereof from the form performs the two fold function of providing an air impervious test for the balloon while at the same time causing the exposed surfaces thereof to be engaged between the disks. Thus, the air inflation step is effective to pressurize the balloon into engagement between the disks. The rotation of the disks with the portion of the inflated balloon in engagement therewith is effective to expand the bead and neck of the balloon over the form to strip the balloon thereform as will be detailed hereinafter.

Yet another object of the present invention is the provision of an improved balloon stripping station and technique of simple design and construction, economical to manufacture, and highly effective in the accomplishment of their intended purposes.

The above and other objects and features of the present invention will become more apparent from a consideration of the following detailed description when taken in conjunction with the drawings in which:

FIG. 1 is a front elevational view of the apparatus of the present invention with a portion cut away to illustrate the closing roller mounting and showing the balloon receiving container cut away in cross sections;

FIG. 2 is sectional view of the apparatus taken along the line 2—2 of FIG. 3;

FIG. 3 is a plan view of the apparatus of the present invention, partially in section, taken along the line 3—3 of FIG. 2;

FIG. 4 is an enlarged fragmentary sectional view of apparatus taken along the line 4—4 of FIG. 3; and FIG. 5 is a fragmentary sectional view of the apparatus taken along the line 5—5 of FIG. 4.

The apparatus of the present invention includes a longitudinally moving endless conveyer mechanism 10 (FIG. 1) of basically conventional type adapted to support a plurality of laterally spaced rows of perpendicularly downwardly extending forms or mandrels 12 on which a stretchable, elastomeric or other balloon article 14 is formed by any well known process. The balloons are formed at a forming station (not shown) and subsequent to the various well-known stages of formation, the balloons are stripped from their forms at the stripping stations shown in the drawings and forming the subject matter of the present invention. The stripping stations, which are the final stage of the series of balloon manufacturing stations, receive the balloons to be stripped from the traveling conveyer 10 which moves the forms in the longitudinal direction indicated by the arrow 11. Albeit three laterally spaced stripping stations are disclosed and shown in the drawings, it is to be understood that this is by way of illustration only and not by way of limitation as the invention may comprise more or less stations than that illustrated.

Positioned adjacent to the conveyer mechanism 10, along the path of travel thereof, and above the mouth of the article 14, at the bead or rim 16 thereof, are series of nozzles or jets 18 for injecting compressed air, or a similar fluid, into the body of the balloon portion for inflation thereof as indicated by the reference numeral 14' in FIG. 1. The nozzles 18 depend from an adjacent compressed air manifold 19 (FIG. 2) and have outlets 21 disposed to direct a compressed air blast on the upper surfaces of the form above the bead 16 of the balloons as the form travels between the nozzles. Conveyer mechanism 10 moves the articles beneath the nozzles 18. The axes of the nozzles preferably form an acute angle with the vertical axes of the form 12, as shown in FIG. 2. While nozzles 18 are shown as disposed on opposite sides of the forms 12 in each of the three rows, it is possible to dispose the nozzles in any other suitable manner in order to meet particular installation requirements.

When the article is inflated on the form prior to the stripping thereof with the apparatus of the present invention, defective articles will be readily detected since the article will not be inflatable if there is a perforation therein or the article will explode if there is a weak spot therein. Thus, the balloon will not inflate if defective as mentioned hereinbefore. The degree of inflation to expand the article to the requisite amount is dependent upon the strength factors of the articles and the shape thereof such as the tensile strength of the body of the article, the thickness of the article, the amount the bead or rim must be stretched, etc. Accordingly, it is possible to test the article and thus determine its quality prior to removal thereof from the form.

Positioned below each of the rows of forms 12 on conveyer mechanism 10 is an associated stripping mechanism generally designated by reference numeral 20. That is, in the embodiment described there will be three laterally spaced rows of forms 12 (as noted above) each having an associated stripping mechanism. Each of the stripping mechanisms 20 comprise a pair of disks **30*a* and 30*b* composed of a resilient material such as spring metal. Integral axially aligned collars 35*a* and 35*b* project from the outer surfaces of disks 30*a* and 30*b*, respectively, and each disk has an axial bore therethrough. The disks receive a shaft 33 within the axial bore and are affixed to shaft 33 so as to be rotatable therewith by the respective set screws 34*a* and 34*b* being threadably engaged in suitable threaded apertures in collars 35*a* and 35*b* in clamping engagement with the shaft. Each pair of disks, 30*a* and 30*b*, is affixed to the shaft so the inner surface of each disk 30*a* will abut the respective inner surface of the companion disk 30*b***. Moreover, the pairs of disks are laterally spaced from one another corresponding to the spacing of the rows of forms.

As shown in FIGS. 1, 2, and 3, a housing 37 is interposed between the pairs of disks. The housing 37 is rotatably supported on shaft 33 by the end bearings 36 (only one of which is shown in FIGS. 1, 2, and 3, it being understood that a similar bearing is connected to the other end of the shaft) which receives shaft 33 in an axial bore 38. For convenience of reference, various points on the disks and the housing will be referred to as being positioned relative to the hours on a clock, as taken in FIG. 1. Thus, for example, the uppermost point on disk **30*a*** will be at 12 o'clock while the lowermost point will be at 6 o'clock.

An arcuate wall 31 projects from and is integral with bearing 36 and extends about bearing 36 from 12 o'clock to approximately 4 o'clock. An arcuate shelf 80 projects inwardly perpendicularly from the rear of the wall 31 and is spaced from the top thereof and extends from 12 o'clock to 6 o'clock. An elongated slot 56 extends circumferentially over a portion of shelf 80. Arms 39 extend from bearing 36 from the 12 o'clock and 6 o'clock points, approximately, toward 7 o'clock and 10 o'clock, respectively, and are connected at their outermost point to the ends of arcuate plate 40, which is spaced from the periphery of disks **30*a* and 30*b***.

An arm 41 extends longitudinally from arcuate plate 40 at the 9 o'clock position and is integral with a laterally extending bar 82.

The intermediate portions of housing 37 comprise an arcuate member **80*a* (FIG. 4) having the same radius as shelf 80 and likewise extending from 12 o'clock to 6 o'clock. Upwardly perpendicularly extending ribs 31*a* project from the upper surface of members 80*a* and extend for the same distance about the circumference of members 80*a* as wall 31 does about bearing 36. Members 80*a* are connected to bar 82 by the longitudinally extending arms 39*a* and the vertically extending arms 39*b*, integral with arms 39*a*. Each member 80*a* has an elongated slot 56*a* therein on either side of rib 31*a*. Each of the intermediate arcuate plates 40 is connected to bar 82 by the respective longitudinally extending arm 41. Ideally, housing 37** may be cast as a unitary structure.

The laterally spaced ears 83 (FIG. 3) project longitudinally from bar 82, at one end thereof, and have an elongated slot 43 therein. Elongated slots 43 receive the laterally projecting pins 42 therein integral with a running nut 44 which is threadably engaged on a vertically extending shaft 45. Shaft 45 is rotatably received in base 46 (which may form a part of the supporting frame, not shown) and has a handle 47 at the top end thereof for rotating threaded shaft 45. Thus, housing 37 may be angularly rotated about the axis of shaft 33 by the lost motion connection constituted by pins 42 and slots 43, as noted above.

Arcuate plate 40 contains a pair of slots **48*a* and 48*b* at one end thereof and a pair of slots 49*a* and 49*b* at the other end thereof. As illustrated in FIG. 2, slots 48*a*, 48*b*, 49*a* and 49*b* may be of the same length but slot 48*b* is positioned slightly below slots 48*a* so only a portion of these slots overlap. Similarly, only a portion of slots 49*a* and 49*b* overlap. A pair of bolts 50*a* and 50*b* are respectively received within slots 48*a* and 48*b* and a pair of bolts 51*a* and 51*b* are respectively received within the slots 49*a* and 49*b*. Depending from and threadably engaged on these bolts are shafts for the associated tapered rollers which are received between the disks 30*a* and 30*b* and extend radially toward the center. Thus, tapered roller 52*a* depends from bolt 50*a* and tapered roller 52*b* depends from bolt 50*b* from approximately 10 o'clock. Roller 53*a* depends from bolt 51*b* and roller 53*b* depends from bolt 51*b* from approximately 7 o'clock. These rollers serve to spread the respective abutting inner surfaces of disks 30*a* and 30*b*** apart in the proximity of these rollers. This is clearly shown in FIGS. 2 and 3. It is to be noted that these rollers are movable along the length of the slots which receive the bolts; thus, the exact position of the rollers along the length of their companion slots is adjustable.

In the present embodiment, two sets of closing roller assemblies, **60*a* and 60*b*, abut portions of the outer surface of each disk 30*a* and 30*b*. However, this number of closing roller assemblies is by way of illustration only and may be varied in the particular installation. The assemblies are shown in detail in FIGS. 4 and 5, and, since all the assemblies are identical, only one will be described in detail. Thus, assembly 60*a*** comprises a base 62a having an arcuate bottom which follows the radius of curvature of the outer periphery of shelf 80a. A threaded shaft 63a extends from the bottom surface of base 62a, near one end thereof, through slot 56a. A nut 64a is received on this shaft and abuts the underside of shelf 80a to secure base 62a in place with base 62a projecting laterally toward its associated disk and with a portion of base 62a projecting past 80a. The top surface of base 62a has a dovetail shaped member 65a projecting centrally therefrom. Plate 66a, having a cooperating channel 67a extending laterally in the bottom portion thereof, slidably receives dovetail 65a therein.

A shaft 68a extends vertically from the upper surface of plate 66a adjacent the end nearest the associated disk and rotatably receives a roller 69a thereon with the axis of the roller parallel to the plane of the disks (FIG. 5). A compression spring 70a abuts wall 31a and portion 66a thereby biasing 66a toward the disk so that roller 69a will abut the outer portion of disk 30a and bias this disk toward disk 30b. A similar closing roller assembly 60a abuts disk 30b at a point opposite to where rollers 69a bears against the outer surface of disk 30a. Thus, the disks 30a and 30b are biased together at these points. It is to be noted that since the closing roller assemblies are adjustable in slot 56 their exact location is adjustable. Thus, as shown in FIG. 1, assembly 60a is located just past 12 o'clock and assembly 60b is located before 3 o'clock.

A sprocket wheel 70 is fixedly mounted to shaft 33 by set screw 70a and receives driving chain 71 in mesh therewith. Chain 71 is connected to a similar sprocket wheel 72, connected to the output shaft of a motor 73 having a speed reducer by any conventional means. In operation, shaft 45 is rotated by turning handle 47, thereby rotating housing 37 about shaft 33 through the lost motion connection between pins 42 and slots 43 to affix the position of the opening rollers and closing roller assemblies relative to the disks in the desired spatial relation. If more exact adjustment is desired, the opening rollers may be moved by loosening the respective bolts 50a and 50b or 51a, 51b, and moving the bolt within the confines of the associated slot. Similarly, the closing roller assemblies may be moved within the confines of slot 56. This provision is incorporated in the device to compensate for the differently sized articles to be stripped.

As the balloons pass through the area containing nozzles 18 air is injected into the balloons, thereby inflating the balloons and causing the ends of the balloons to elongate, as denoted by the character 14″ (FIGS. 1 and 5), passing into engagement between the inner surfaces of the disks which have been opened by action of rollers 52a and 52b. That is, rollers 52a and 52b cause the disks to spread apart a predetermined distance to either side of the rollers against the resiliency of the disks. Hence, the rollers are initially adjusted, as noted above, so a crevice or spacing will be formed between the inner surfaces of resilient disks 30a and 30b of sufficient width to receive elongated inflated portion 14″ of balloon 14, thereby defining a gripping region (FIG. 1). The disks are rotated in the direction indicated by arrow 75 by motor 73, through the chain drive 71 which is trained over the sprocket wheels 70 and 72.

It will be apparent that the balloon is inflated into surface-to-surface engagement between the disks at the gripping region with a cushion of air disposed between the form and the disks to maintain the requisite surface-to-surface engagement. The concomitant rotation of the disks and movement of the conveyer advances the balloon between the inner surfaces of the disks past the gripping region until stripping is accomplished. As the lower body portion 14″ of the balloon is gripped between the inner surfaces of disks 30a and 30b, which are forced together by action of the closing roller assemblies 60a, the fluid medium in the articles is forced upwardly and assists in widening the upper portion to facilitate and assist the disks in the downward pulling action that evolves. After the top part of the article has become inflated, which occurs when a portion 14″ of the article has passed between the engaging portion of the disks, the enlarged portion of form 12 is surrounded by the bead 16. (FIG. 1.) The fluid pressure will lift the bead from the forms to allow a thin film of air to pass under the bead and, when this takes place, the finished article 14 will be pulled off the form 12. That is, relative longitudinal movement of conveyor 10 and counterclockwise rotation of the disks will cause the article to leave the form 12 as shown in FIG. 1. As the disks rotate further, past closing roller assemblies 60a in the direction of arrow 75, closing roller assemblies 61b will maintain the disks 30a and 30b biased toward one another with balloon 14 firmly gripped therebetween. As the disks rotate further in the aforementioned direction, past the second closing roller assemblies 60b, no force will be exerted to maintain the balloons between the disks beyond the resiliency of the disks. As the rotation of the disks bring the stripped balloon to approximately the 6 o'clock point, the disks begin to separate by action of the tapered rollers 53a and 53b. This is indicated in the lower portion of the right hand pair of disks in FIG. 2. At this point, the balloons will drop from between the disks into a conveniently placed balloon receptacle 76.

It is to be noted that since the inner surfaces of the disks are spread apart a predetermined distance at the point of their engagement with the balloons, the mandrels 12 need not be exactly on center with respect to the pair of disks but it is only important that the balloons are received between the disks at the point of their engagement. That is, the mandrels 12 may be off to a side with respect to a pair of disks but a portion of the balloon will still be received between the disks if the crevice is wide enough.

Thus, in accordance with the objects of the present invention, I have provided an article stripping machine which effectively and efficiently strips articles from mandrels or forms, wherein the articles may comprise a rubber or elastomeric substance.

Having disclosed a preferred embodiment of the present invention, it will become apparent to those skilled in the art that various modifications and arrangements may be made therein without departing from the spirit and scope of the present invention.

What is claimed is:

1. Apparatus for stripping articles from associated forms, comprising a companion pair of coaxial rotatable friction members having cooperating inner surfaces adapted to engage said articles at an article gripping region, opening means for said friction members in advance of said gripping region for laterally spacing said members to receive said articles therebetween, closing means for said friction members at said gripping region for clamping said articles between said friction members, a plurality of forms having articles thereon, means for directing fluid pressure between said forms and articles to inflate the latter into surface-to-surface engagement with said inner surfaces of said members at said gripping region, and means to convey said plurality of forms and articles thereon in a predetermined longitudinal path through said gripping region whereby the inflated articles are concomitantly longitudinally conveyed and rotated away from said forms for stripping said articles therefrom by said members.

2. Apparatus for stripping balloons from companion forms, comprising, in combination, a pair of normally closed rotatable friction disks having cooperating inner surfaces at a peripheral zone thereof to engage end portions of the balloons at a predetermined gripping region, a plurality of forms with balloons thereon, means for conveying said forms and balloons thereon in a longitudinal path through said gripping region, means for opening said disks in advance of said gripping region for spacing said disks to receive said balloons from said conveying means, and means for inflating said balloons into surface-to-surface engagement with the inner surfaces of said disks at said gripping region whereby the inflated balloons are stripped from their forms by the composite longitudinal movement of said conveying means and the rotation of said disks beyond said gripping region.

3. Apparatus for stripping balloons from companion forms as defined in claim 2, and closing means for said friction disks at said gripping region for clamping said articles between said friction disks.

4. Apparatus for stripping balloons from associated forms, comprising a plurality of laterally spaced pairs of resilient rotatable disks, each pair of disks having abutting inner surfaces adapted to engage said balloons at a balloon gripping region, respective opening means for each of said pair of resilient disks in advance of said gripping region for opening the associated pair of disks, a plurality of laterally spaced rows of forms with balloons thereon, conveyer means for conveying said rows in a longitudinal path so each row of forms traverses a different gripping region, means for directing air pressure between the forms and balloons in each of said rows to inflate the balloon into surface-to-surface engagement with the inner surfaces of the associated disks at the particular gripping region, whereby the inflated balloons are stripped from their forms by the concomitant longitudinal movement of said conveying means and the rotation of said disks beyond said gripping region.

5. Apparatus for automatically stripping articles from the forms on which they are made comprising, a pair of rotatable resilient disks having cooperating inner surfaces adapted to engage said articles at an article gripping region, a pair of tapered rollers extending radially between said resilient disks in advance of said gripping region for spacing said disks apart to receive said articles therebetween, closing means for said disks at said gripping region for clamping said articles between said resilient disks, a plurality of forms having articles thereon, means for directing fluid pressure between said forms and articles to inflate the latter into surface-to-surface engagement with said inner surfaces of said disks at said gripping region, and conveyer means to convey said plurality of forms and articles thereon in a predetermined longitudinal path through said gripping region whereby the articles are concomitantly longitudinally conveyed and rotated away from said form for stripping said articles therefrom by said members.

6. Apparatus for automatically stripping articles from the forms on which they are made as defined in claim 5, wherein said tapered rollers project past the periphery of said disks, and means for rotating said rollers relative to the center of the disks.

7. Apparatus for automatically stripping balloons from the forms on which they are made comprising, in combination, a shaft, a pair of normally closed friction disks having cooperating inner surfaces at a peripheral zone thereof to engage end portions of the balloons at a predetermined gripping region mounted to said shaft for rotation therewith, a plurality of forms having a neck portion and an enlarged depending portion with balloons thereon, conveyer means for conveying said forms in depending relation above said disks in a longitudinal path through said gripping region, opening means for said disks in advance of said gripping region for spacing said disks to receive said balloons for said conveying means, means for inflating said balloons into surface-to-surface engagement with the inner surfaces of said disks at said gripping region, closing means at said gripping region to bias said disks toward each other to firmly grip the balloons between said disks, and means to rotate said shaft so the relative movement of said conveyer means and said disks slide the neck of said article away from the stem portion and over the enlarged portion to bodily strip the article from the form.

8. Apparatus for automatically stripping balloons from the forms on which they are made comprising the combination set out in claim 7, and a second opening means past said closing means for spacing said disks to release the stripped balloons from between the disks.

9. Apparatus for stripping balloons from companion forms, comprising, in combination, a companion pair of rotatable friction members having cooperating inner surfaces adapted to engage balloons at a balloon gripping region, a first pair of tapered rollers positioned between said members in advance of said gripping region for laterally spacing said members to receive balloons therebetween, closing means for said friction members at said gripping region for clamping balloons between said friction members, a plurality of forms having balloons thereon, means for directing fluid pressure between said forms and balloons to inflate the latter into surface-to-surface engagement with said inner surfaces of said members at said gripping region, means to convey said plurality of forms and balloons thereon in a predetermined longitudinal path through said gripping region whereby the inflated balloons are concomitantly longitudinally conveyed and rotated away from said forms for stripping said articles therefrom by said members, and a second pair of tapered rollers positioned between said member past said closing means for laterally spacing said members to release the stripped balloons.

10. Apparatus for stripping balloons from companion forms comprising the combination set forth in claim 9, wherein said first and second pair of rollers project past the edge of said friction members, a plate rotatably receiving the projecting ends of said first and second pair of rollers, a threaded shaft having a running nut thereon, and means connecting said running nut and said plate for rotating said rollers about the axes of said friction members when said threaded shaft is rotated.

11. Apparatus for stripping balloons from companion forms as defined in claim 9, wherein said closing means comprises a pair of rollers, each one of said pair of rollers being associated with a respective friction member, a housing adjacent said friction members, a pair of laterally movable plates on said housing adjacent each friction member, said plates rotatably receiving a respective roller thereon, means for biasing each plate toward the associated friction member so said rollers will abut the respective friction member, and means on said housing for positioning said rollers so said rollers can be moved opposite each other.

References Cited by the Examiner

UNITED STATES PATENTS

| | | | |
|---|---|---|---|
| 1,605,445 | 11/1926 | Killian | 18—2 |
| 1,814,712 | 7/1931 | Kurkjian | 18—2 |
| 2,628,387 | 2/1953 | Landau | 264—2 |
| 2,669,762 | 2/1954 | Blackburn | 264—335 |
| 2,714,451 | 8/1955 | Gammeter | 18—2 |
| 3,176,059 | 3/1965 | Cremer | 264—335 |

FOREIGN PATENTS

| | | |
|---|---|---|
| 1,087,345 | 8/1960 | Germany. |

J. SPENCER OVERHOLSER, *Primary Examiner.*

ROBERT F. WHITE, *Examiner.*

R. B. MOFFITT, E. MAR, *Assistant Examiners.*